United States Patent [19]

Heier et al.

[11] Patent Number: 4,838,488

[45] Date of Patent: Jun. 13, 1989

[54] DEVICE FOR DELIVERING WASHING LIQUID TO TWO SPACED SPRAYING NOZZLES FOR MOISTENING A WINDSHIELD OF A MOTOR VEHICLE

[75] Inventors: Christoph Heier, Iffezheim; Gerd Lentz; Rainer Ritter, both of Buehl, all of Fed. Rep. of Germany

[73] Assignee: Robert Bosch GmbH, Stuttgart, Fed. Rep. of Germany

[21] Appl. No.: 151,476

[22] Filed: Feb. 2, 1988

[30] Foreign Application Priority Data

Mar. 14, 1987 [DE] Fed. Rep. of Germany ....... 3708327

[51] Int. Cl.$^4$ ................................................. B05B 1/10
[52] U.S. Cl. ................................. 239/284.1; 239/446; 137/594; 415/152.2
[58] Field of Search .............. 239/284.1, 284.2, 436, 239/443, 444, 446; 137/594; 417/291; 415/148 R, 152 R, 152 A, 149 R, 149 A

[56] References Cited

U.S. PATENT DOCUMENTS

| | | | |
|---|---|---|---|
| 2,470,471 | 5/1949 | Carleton | 137/594 |
| 2,588,644 | 3/1952 | McLeod | 417/291 |
| 4,331,295 | 5/1982 | Warihashi | 239/284.1 |
| 4,467,627 | 8/1984 | Platt et al. | 415/152 A |
| 4,600,361 | 7/1986 | Bianco | 415/152 A |
| 4,679,983 | 7/1987 | Pietryk et al. | 415/152 A |
| 4,728,260 | 3/1988 | Ishii | 415/152 A |

FOREIGN PATENT DOCUMENTS

| | | |
|---|---|---|
| 3023897 | 6/1980 | Fed. Rep. of Germany . |
| 1204371 | 9/1970 | United Kingdom . |
| 1414614 | 11/1975 | United Kingdom . |
| 1500784 | 2/1978 | United Kingdom . |

Primary Examiner—Andres Kashnikow
Assistant Examiner—Christopher G. Trainor
Attorney, Agent, or Firm—Michael J. Striker

[57] ABSTRACT

A device for delivering washing liquid to two spraying nozzles spaced from each other at two areas of a pane being washed or two panes being washed comprises a pump with a rotor driven in two opposite directions and a delivery unit connected to the pump and having two pressure chambers with two outlets connected to the respective nozzles and each alternatively receiving the liquid from the pump. A limiter which separates the chambers from each other has two portions movable under pressure and each provided with a sealing diaphragm which closes the respective outlet. Two diaphragms can close both outlets when the pump is in non-operative position.

11 Claims, 1 Drawing Sheet

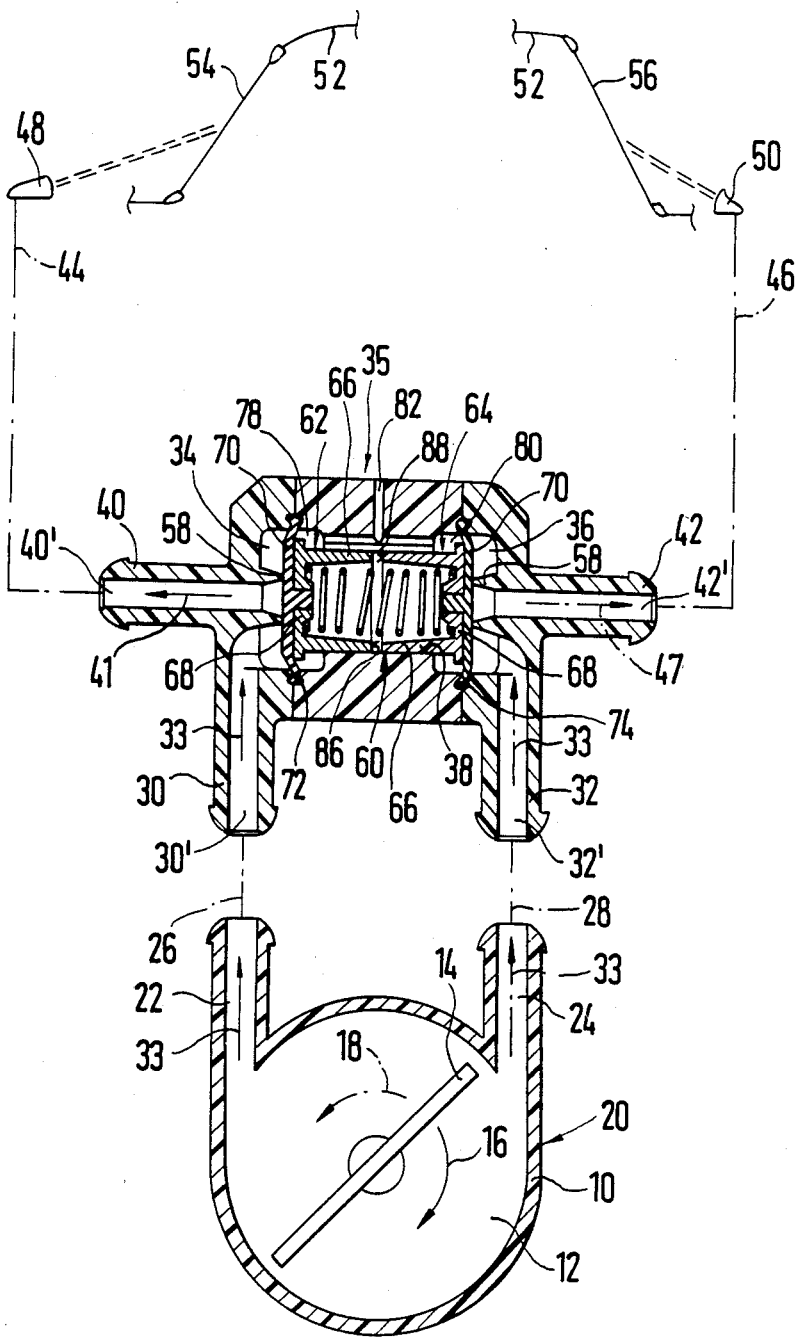

DEVICE FOR DELIVERING WASHING LIQUID TO TWO SPACED SPRAYING NOZZLES FOR MOISTENING A WINDSHIELD OF A MOTOR VEHICLE

BACKGROUND OF THE INVENTION

The present invention relates to a device for feeding a washing liquid to two spraying nozzles spaced from each other so as to wet either two spaced areas of a windshield or the front windshield and a rear pane of the automobile.

A liquid delivery device of the type under discussion has been disclosed, for example in DE-OS No. 8336073. The device has two pressure chambers separated from each other by a limiter which is formed by a diaphragm which alternatively closes each of two pressure chambers, depending on the direction of rotation of the pump rotor, so that the washing liquid flows via the one or another outlet to the respective spraying nozzle.

Such devices are often utilized for moistening the front and the rear panes of motor vehicles and at least one of the spraying nozzles can be disposed in the region body of the vehicle, in which lower pressure is built up during the travel of the vehicle so that the washing liquid can be sucked from the device. This can, however cause an idle suction of the liquid from the feeding pump which is normally a non-sealed flow pump to the liquid supply tank which belongs to the system.

When such conventional device is used, for example for moistening the front windshield and the headlight pane the entire system arranged deeper or lower than the supply tank to empty the spraying nozzles corresponding to the headlights to prevent said undesired suction effect.

In order to avoid the situation that no liquid would be available in critical conditions the feeding lines between the pump and spraying nozzles must be provided with check valves.

SUMMARY OF THE INVENTION

It is an object of the present invention to provide an improved device for delivering washing liquid to the spraying nozzles at the windshield.

It is another object of the invention to provide a washing liquid delivery device in which the limiter that separates two pressure chambers from each other would also function as two check valves of the conventional device, of the foregoing type so that the structure of the feeding unit would be substantially simplified.

These and other objects of the invention are attained by a device for alternatively delivering liquid to two spraying nozzles positioned at pane regions of a motor vehicle to be moistened and spaced from each other, comprising a feeding pump having a pump chamber having a first outlet and a second outlet and a rotor positioned in said pump chamber and driven to rotate in two opposite directions; and delivery means connected to said pump to receive said liquid therefrom and including a first pressure chamber and a second pressure chamber, a limiter separating said chambers from each other, said rotor pumping said liquid depending on a direction of rotation thereof through said first outlet into said first pressure chamber or through said second outlet into said second pressure chamber, said limiter being movable by pressure built up in either of said pressure chambers, each pressure chamber having an outlet connection connected to a respective spraying nozzle, said limiter being subdivided transversely to a direction of the movement thereof into two portions, each portion having a wall which limits a respective one of said pressure chambers, said wall of each portion of said limiter having a sealing region which corresponds to a respective outlet connection of the assigned pressure chamber, and means for generating a force on each sealing region to urge each portion of said limiter to abut against the respective outlet connection when said pump is in non-operative position, said force being smaller than a feeding pressure of said pump.

The delivery means may include a common housing element in which said first and second pressure chambers are formed, said first and second pressure chambers being connected to each other by a passage in which said two portions of said limiter are movably guided.

Each portion of said limiter may have a cup-shaped cross-section.

Said wall having a sealing region may be a bottom wall of the cup-shaped portion of said limiter, each portion of said limiter having a peripheral wall guided in said passage.

Two portions of the limiter may have edges which face each other and form supporting shoulders which cooperate with each other upon the movement of a respective portion of said limiter.

The delivery means may further include two diaphragms each positioned on said bottom wall of each portion of said limiter and having a central portion which forms said sealing region, each diaphragm having an edge which is tightly anchored against said liquid in said housing element.

The central portion of each diaphragm may be connected to the bottom wall of the cup-shaped limiter portion.

The housing element may have said outlet connections which are provided opposite said bottom walls of said portions of said limiter, said housing element having flange projections protruding into respective pressure chambers and formed at said outlet connections.

The force generating means may be a prestressed spring element supported between two bottom walls of said portions of said limiter.

Said spring element may be a helical compression spring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is a combined view of a schematically illustrated front-and-rear windshield of a motor vehicle with a sectional view of the device for delivering moistening liquid to the windshield, according to the invention.

DETAILED DESCRIPTION OF THE PREFERRED EMBODIMENT

Referring now to the drawings in detail it will be seen that the moistening liquid delivery device includes a pump, the housing of which is denoted by reference numeral 10. The pump is shown in section so that its pump chamber 12 and a pump rotor 14 rotationally mounted therein are visible. The pump rotor 14 is driven by a non-shown electric motor in the first, clockwise direction as shown by arrow 16. However, as known by switching over the poles of the electric motor the pump, rotor can be also driven in the opposite direction which is counter clockwise direction shown by arrow 18. Such a delivery or feeding pump is in the known fashion connected with the supply tank filled the liquid to be applied to the windshield to wet the latter.

The pump chamber 20 has two tubular connections substantially parallel to each other and forming two outlets 22 and 24. Respective feeding lines or conduits 26 and 28 shown schematically are connected to the chamber outlets 22, 24. These feeding lines 26 and 28 lead to tubular connections 30 and 32 of a structural component 35 of the moistening liquid delivery device. Channels 30' and 32' provided in tubular connections 30 and 32 open into the first pressure chamber 34 and the second pressure chamber 36 respectively. Both pressure chambers 34 and 36 are provided in the element 35. These two pressure chambers are connected to each other by a passage 38 the diameter of which is somewhat smaller than the diameters of the substantially cylindrical pressure chambers 34 and 36. The element 35 has in the extension of passage 38, and also along the axes of cylindrical chambers 34 and 36, two outlet connections 40 and 42 to which feeding lines 44 and 45 are respectively connected. Each feeding line 44, 46 leads to at least one spraying nozzle 48, 50. These nozzles have their openings spaced from each other and directed to the respective areas of the windshield of the power vehicle which is designated at 52. Spraying nozzle 48 must also wet the front windshield 54 while the spraying nozzle 50 can wet the rear pane 56 of the vehicle 52.

Tubular connections 40, 42 have bores 40' and 42', respectively, which are connected with the pressure chambers 34 and 36 and thus form the outlets of these pressure chambers. The sides of bores 40', 42', which face the pressure chambers are surrounded by inwardly projecting annular flanges 58 of the element 35.

Two pressure chambers 34 and 36 are separated from each other by a limiter or divider 60. The limiter 60 has two cup-shaped portions 62 and 64 the annular walls 66 of which are displaceable in the passage 38. The limiter portions 62 and 64 are formed so that their bottom walls 68 have at the inner sides projections or flanges directed in the same direction as the flanges 58 at outlet bores 40', 42'. A diaphragm 70 is attached to the external side of the bottom wall 68 of each limiter portion 62, 64. The middle region of each diaphragm 70 is connected to the bottom wall 68 of the respective portion of the limiter 60. The rine or edge 72, 74 is tight-sealed in the element 35 against the liquid being delivered to the windshield. The central region of each diaphragm 70 is formed as a sealing portion which cooperates with the annular flanges 58. Each pressure chamber 34, 36 is limited by the limiter 60 mounted between these two chambers. Two diaphragms 70 as well as a helical compression spring 76 also belong to the limiter 60 in addition to its portions 62 and 64. The helical compression spring is prestressed and supported on the inner side of the bottom walls of the cup-shaped limiter portions 62, 64. Inasmuch as two diaphragms 70 are arranged in the middle region of the cylindrical chambers two annular spaces 78 and 80 result between these diaphragms and the openings of the passage 38 which face the diaphragm 70 respectively. Circular spaces 78 and 80 are connected with atmosphere via a vent channel 82.

As further shown in the drawing two opposing edges 86 and 88 of the limiter portions 62 and 64 are spaced from each other when the liquid delivery device is in a non-operative position while the compression spring 76 presses the sealing regions of two diaphragms 70 against annular flanges 58 of the element 35. Thereby the closing force of the compression spring 76 is smaller than the feeding pressure of the delivery pump 20.

The mode of operation of the moistening liquid delivery device is as follows:

When the windshield 54 of the motor vehicle 52 should be wetted the pump rotor 14 of pump 20 must be driven to rotate in the clockwise direction as shown by arrow 16. The medium sucked from the supply tank by the pump 20, which is in the proposed case a washing liquid, is conveyed via the outlet 22 of the pump, pressure line 26 and connection 30 into the pressure chamber 34 as shown by arrows 33. It is clear that a very small pressure is established in the pressure chamber 34 at this point. The liquid at the high pressure built up in the pressure chamber 34 will act on the limiter portion 62 against the force of the compression spring 76 so as to lift the sealing portion of the diaphragm 70 from the annular flange 58 at the outlet 40'. The limiter portion 62 will finally contact with its edge 86 the edge 88 of the other limiter portion 64. Thereby air enclosed in the annular space 78 must not be compressed but escape from space 78 via vent, channel 82 into the atmosphere. In the aforedescribed operation position, the liquid being delivered to the windshield can now flow from the pressure chamber 34 via outlet connection 40 and feeding line 44 to the spraying nozzle 48 to wet the windshield 54 as shown by arrow 41.

When the rear pane 56 should be wetted the pump rotor 14 must be driven to rotate in the counter clockwise direction as shown by arrow 18. The washing liquid will be fed, as shown by arrow 33, via the outlet 24, feeding line 28 and tubular connection 32 into the pressure chamber 36 in which the built-up pressure will displace the limiter portion 64 and lift the sealing portion of the right-hand diaphragm 70 from the annular flange 58 the outlet 42'. Air which is present in the annular space 80 escapes via the vent channel 82 into the atmosphere. The movement of the limiter portion 64 in the direction towards the limiter portion 62 is possible in this case because a very insignificant pressure is present in chamber 34 so that only the limiter portion 64 is moved. The washing liquid can thus flow via outlet 42' and feeding line 46 to the spraying nozzle 50, as shown by arrow 47.

When the feeding pump 20 is switched off and the limiter 60 takes the position shown in the drawing both limiter portions 62 and 64 operate together with the sealing portions of diaphragms 70 and compression spring 76 as a non-return or check valve so that due to their specific constructions two outlets 40' and 42' are reliably closed. The idling of the feeding system is for the aforementioned reasons, not possible.

Element 35 which actually serves to house the liquid delivery device can be formed as a separate structural component or alternatively be incorporated in the housing 10 of the feeding pump 20.

It will be understood that each of the elements described above, or two or more together, may also find a useful application in other types of devices for delivering washing liquid to windshield of motor vehicles differing from the types described above.

While the invention has been illustrated and described as embodied in a device for delivering washing liquid to a windshield of a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for delivering liquid to two spraying nozzles positioned at two pane regions of a motor vehicle to be moistened and spaced from each other, comprising a feeding pump having a pump chamber having a first outlet and a second outlet, and a rotor positioned in said pump chamber and driven to rotate in two opposite directions; and delivery means connected to said pump to receive said liquid there from and including a first pressure chamber and a second pressure chamber, a limiter separating said chambers from each other, said rotor pumping said liquid in dependence on the direction of rotation thereof through said first outlet into said first pressure chamber or through said second outlet into said second pressure chamber said limiter being movable by pressure built up in either of said pressure chambers, each pressure chamber having an outlet connection connected to a respective one of said spraying nozzles, said limiter being subdivided transversely to a direction of the movement thereof into two portions, each portion having a wall which limits a respective one of said pressure chambers, said wall of each portion of said limiter having a sealing region which corresponds to a respective one of said outlet connections of the assigned pressure chamber, and means for generating a force on each of said sealing regions to urge each portion of said limiter to abut against the respective outlet connection when said pump is in non-operative position, said force being smaller than a feeding pressure of said pump; said delivery means including a common housing element in which said first and second pressure chambers are formed, said first and second pressure chambers being connected to each other by a passage in which said two portions of said limiter are movably guided, each portion of said limiter having a cup-shaped cross-section.

2. The device as defined in claim 1, wherein said wall having said sealing region is a bottom wall of the cup-shaped cross section of said limiter, each portion of said limiter having a peripheral wall guided in said passage.

3. The device as defined in claim 2, wherein said two portions have edges which face each other and form supporting shoulders which cooperate with each other upon the movement of a one of said portions of said limiter with respect to the other of said portions of said limiter.

4. The device as defined in claim 2, further including two diaphragms each positioned on said bottom wall of each portion of said limiter each having a central portion which forms said sealing region, each diaphragm having an edge which is tightly anchored against said liquid in said housing element.

5. The device as defined in claim 4, wherein said central portion is connected to said bottom wall of a respective portion of said limiter.

6. The device as defined in claim 4, wherein said housing element has said outlet connections which are provided opposite said bottom walls of said portions of said limiter, said housing element having flange projections protruding into respective pressure chambers and formed at said outlet connections.

7. The device as defined in claim 2, wherein said force generating means is a prestressed spring element supported between the two bottom walls of said portions of said limiter.

8. The device as defined in claim 7, wherein said spring element is a helical compression spring.

9. The device as defined in claim 4, wherein said passage has at two regions spaced from said diaphragms two annular spaces each surrounding a peripheral wall of a respective portion of said limiter, said housing element having a vent channel, said annular spaces being connected to said vent channel.

10. The device as defined in claim 1, wherein said housing element is integrated in the housing of said pump.

11. A device for delivering liquid to two spraying nozzles positioned at two pane regions of a motor vehicle to be moistened and spaced from each other, comprising a feeding pump having a pump chamber having a first outlet and a second outlet, and a rotor positioned in said pump chamber and driven to rotate in two opposite directions; and delivery means connected to said pump to receive said liquid therefrom and including a first pressure chamber and a second pressure chamber, a limiter separating said chambers from each other, said rotor pumping said liquid in dependence on the direction of rotation thereof through said first outlet into said first pressure chamber or through said second outlet into said second pressure chamber, said limiter being movable by pressure built up in either of said pressure chambers, each pressure chamber having an outlet connection connected to a respective one of said spraying nozzles said limiter being subdivided transversely to a direction of the movement thereof into two portions, each portion having a wall which limits a respective one of said pressure chambers, said wall of each portion of said limiter having a sealing region which corresponds to a respective one of said outlet connections of the assigned pressure chamber, and means for generating a force on each of said sealing regions to urge each portion of said limiter to abut against the respective outlet connection when said pump is in non-operative position, said force being smaller than a deeding pressure of said pump, each portion of said limiter having a cup-shaped cross-section.

\* \* \* \* \*